(12) United States Patent
Elliott

(10) Patent No.: US 8,972,125 B1
(45) Date of Patent: Mar. 3, 2015

(54) OPERATOR INDUCED OSCILLATION FILTER TO PREVENT INSTABILITY FROM OPERATOR

(71) Applicant: Caterpillar, Inc., Peoria, IL (US)

(72) Inventor: Christopher Elliott, Apex, NC (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/155,098

(22) Filed: Jan. 14, 2014

(51) Int. Cl.
*G06F 19/00* (2011.01)
*G06F 3/0338* (2013.01)

(52) U.S. Cl.
CPC .................................. *G06F 3/0338* (2013.01)
USPC .......................................................... 701/50

(58) Field of Classification Search
CPC .................................. G60F 7/70; G60F 19/00
USPC .................. 701/50, 53, 58, 66, 538
See application file for complete search history.

(56) References Cited

U.S. PATENT DOCUMENTS

| 4,030,011 | A | 6/1977 | Hendrick et al. |
| 4,298,833 | A | 11/1981 | Edwards et al. |
| 2007/0142928 | A1* | 6/2007 | Moughler et al. ............... 700/12 |

* cited by examiner

*Primary Examiner* — Kim T Nguyen
(74) *Attorney, Agent, or Firm* — Miller, Matthias & Hull LLP

(57) ABSTRACT

A system for controlling manual input device damping, and a related method and computer program product are disclosed. The system may comprise a manual input device mounted on a machine, a sensor that transmits to a controller an input signal indicative of the motion, acceleration, and/or deceleration of the machine, a variable damper that selectively alters the resistance of the input device to displacement based on a command signal transmitted by the controller, and a controller configured to adjust the resistance of the input device by adjusting the damping provided by the variable damper based on filtering of a historical trend of oscillation amplitudes at a frequency of concern.

20 Claims, 6 Drawing Sheets

OPERATOR INDUCED OSCILLATION FILTER TO PREVENT INSTABILITY FROM OPERATOR

TECHNICAL FIELD

The present disclosure generally relates to control systems and, more particularly, for control systems for use on machines to adjust the resistance to movement of manual control devices.

BACKGROUND

Machines are typically controlled by a combination of control devices. For example, an operator may use one device to move the machine into a desired direction, for example, a steering wheel or yolk, a different device to accelerate and decelerate the machine, for example, joystick, pedals or levers, and another device, for example, a joystick, to operate an implement of the machine, such as a bucket or shovel.

Currently, machines such as skid steer loaders, excavators, cranes, wheel loaders, and the like, use joystick-type control devices to control the motion of their implements or the speed of the machine. These joysticks may have two, three or more degrees of freedom of motion, each of which corresponds to a particular direction or type of motion of the machine or work implement. When an operator is manipulating the control, the operator can move the control in various fashions to achieve the desired movement of the machine, placement and trajectory of the work implement, and the like.

During some operations of a machine, vibrations may be perceptible in the operator cab, and specifically, in the handle of a joystick or other manual control device. Such vibrations may be the result of travel of the machine over uneven terrain, vibration of a work implement that is transferred to the cab and other vibration sources. Examples of work implements that can induce a vibration include, but are not limited to, pneumatic hammers, augers, and the like. Vibrations/oscillations, whether produced by the machine, or the implement, or otherwise are generally known as Operator Induced Oscillation (OIO) when the vibration (motion) of the machine, implement, or the like, causes motion of the operator during operation of the machine, which causes unwanted motion of the input device (joystick, lever, pedal, and the like.)

U.S. Pat. No. 4,298,833 issued Nov. 3, 1981 (the '833 patent) discloses an apparatus for damping operator induced oscillations of a controlled system responding to an operator controller signal utilizing a lag-lead filter for frequency and amplitude estimation of the control input, and a rectification and smoothing filter for producing a signal proportional to the absolute value of the frequency and amplitude estimate for use in suppression of the control system output signal. In one embodiment this is accomplished by computing a correction signal in a correction generating section. In a second embodiment, a second rectification and smoothing filter produces a signal proportional to the absolute value of the controlled input signal. A ratio of the outputs of the first and second rectification and smoothing filters is then used in a generator to generate a gain factor for the control system to reduce the gain of the output signal of the control system. This type of system has drawbacks. It does not use the filtered output to adjust the physical resistance of the manual control input device used by an operator to control a machine or implement. A better system for the operator is needed.

SUMMARY OF THE DISCLOSURE

In accordance with one aspect of the disclosure, a control system is disclosed. The system may comprise a manual input device mounted to a machine and including a pivotable body, a sensor that transmits to a controller an input signal indicative of the motion, acceleration or deceleration of the machine in a current time period, a variable damper that selectively alters the resistance of the body to displacement based on a command signal transmitted by the controller, the variable damper operably connected to the body, and the controller in operable communication with the sensor and the variable damper. The controller may be configured to process a signal based on the input signal to determine a current amplitude at a frequency of concern, filter a historical trend of a plurality of amplitudes at the frequency of concern, and based on the filter of the historical trend, to adjust the resistance of the body to movement by adjusting the damping provided by the variable damper to the body. The plurality of amplitudes may include the current amplitude and preceding amplitudes. Each of the preceding amplitudes may be obtained from input signals transmitted by the sensor during past time periods that precede the current time period.

In an embodiment, the filter of the historical trend may generate a filter output having a different value than the current amplitude. In a further refinement, the filter of the historical trend may generate a profile that smoothes spikes in the historical trend, while allowing a faster rate of increase in amplitudes than rate of decrease.

In another embodiment, the variable damper may be a magnetorheological fluid-based variable damper. In a refinement, the control system may further comprise an electromagnet configured to produce a magnetic field. The electromagnet in operable communication with the variable damper and the controller. The command signal may adjust the amount of current provided to the electromagnet based, at least in part, on the filter of the historical trend. In a further refinement, the controller may be further configured to map a filter output of the filtering of the historical trend to a damping rate command, and the amount of current provided to the electromagnet may be determined by the damping rate command.

In another embodiment, the controller may be further configured to map a filter output of the filtering of the historical trend to a damping rate command. The amount of resistance of the body may be determined by the damping rate command.

In another embodiment, the signal processed by the controller may represent a combination of a plurality of input signals received during the current time period.

In yet another embodiment, the controller may be further configured to use a FFT to process the signal in order to determine the current amplitude at the frequency of concern.

In accordance with another aspect of the disclosure, a method of controlling input device damping of an input device mounted to a machine and including a pivotable body is disclosed. The method may comprise processing a signal based on an input signal to determine a current amplitude at a frequency of concern, filtering a historical trend of a plurality of amplitudes at the frequency of concern to generate a filter output, and based on the filter output generated by the filtering, adjusting, by the controller, the resistance of the input device to movement by adjusting the damping provided by a variable damper to the input device, the variable damper operably connected to the input device. The input signal may be indicative of the motion, acceleration, or deceleration of the machine during a current time period. The plurality of amplitudes may include the current amplitude and preceding amplitudes. Each of the preceding amplitudes may be obtained from the input signals transmitted by a sensor during past time periods that precede the current time period.

In an embodiment, the signal processed by the controller may represent a combination of input signals received during the current time period.

In another embodiment, a profile of filter outputs over time may have a slower rate of decline for amplitudes at the frequency of concern than the rate of decline in the historical trend.

In an embodiment, a profile of filter outputs over time may smooth spikes that occur in the historical trend, and allow a faster rate of increase in profile amplitudes than rate of decrease.

In an embodiment, the variable damper may be a magnetorheological fluid-based variable damper. In a refinement, the method may further comprise producing a magnetic field with an electromagnet wherein the controller adjusts the amount of current provided to the electromagnet based, at least in part, on the filtering of the historical trend. The electromagnet in operable communication with the variable damper. In a refinement, the method may further comprise mapping the filter output to a damping rate command that determines the amount of current provided to the electromagnet.

In an embodiment, the method may further comprise mapping the filter output to a damping rate command, wherein the amount of resistance of the body is determined by the damping rate command.

In another embodiment, the controller may be further configured to use a FFT to process the signal.

In accordance with a further aspect of the disclosure, a computer program product is disclosed. The computer program product may comprise a non-transitory computer usable medium having a computer readable program code embodied therein. The computer readable program code may be adapted to be executed to implement a method for controlling input device damping of an input device mounted to a machine, the method comprising processing a signal based on an input signal to determine a current amplitude at a frequency of concern, filtering a historical trend of a plurality of amplitudes at the frequency of concern to generate a filter output, and based on the filter output generated by the filtering, adjusting, by the controller, the resistance of the input device to movement by adjusting the damping provided by a variable damper to the input device, the variable damper operably connected to the input device. The input signal may be indicative of the motion, acceleration, or deceleration of the machine during a current time period. The plurality of amplitudes may include the current amplitude and preceding amplitudes. Each of the preceding amplitudes may be obtained from the input signals transmitted by the sensor during past time periods that precede the current time period. In an embodiment, the filter output may be different from the current amplitude.

DETAILED DESCRIPTION

Figure 1:
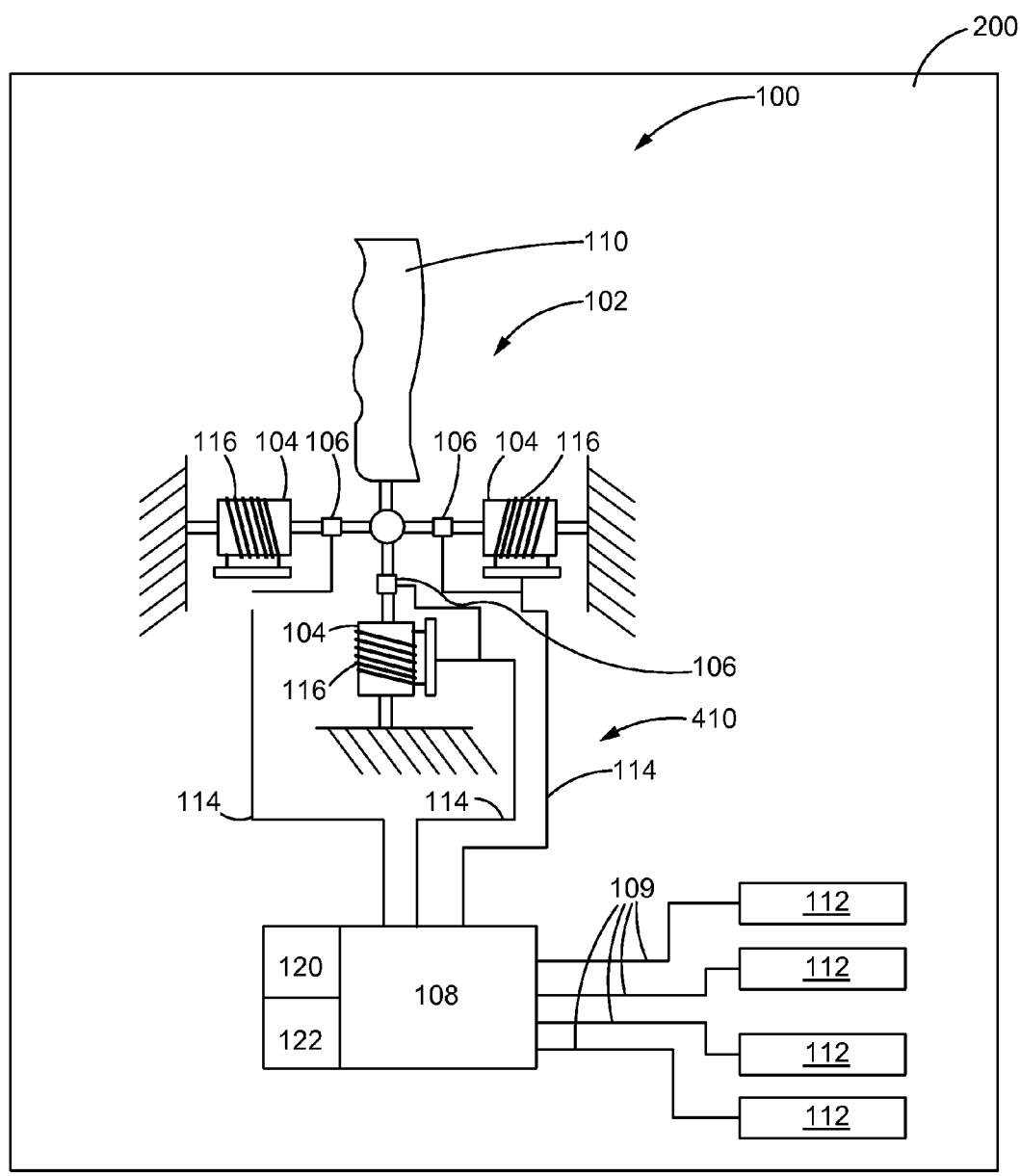
FIG. 1 is a general schematic view of an exemplary embodiment of a control system constructed in accordance with the teachings of this disclosure.

Referring now to the drawings, and with specific reference to FIG. 1, there is shown a control system in accordance with the present disclosure and generally referred to by reference numeral 100. The control system 100 may comprise a manual input device 102, a variable damper 104, one or more sensors 106, and at least one controller 108.

This disclosure describes an exemplary embodiment of the control system 100. While the exemplary embodiment of the control system 100 is described relative to a machine having a work implement for which operation of the work implement may be carried out by the selective control of actuators that are responsive to command signals from the controller, the teachings of this disclosure may be employed on other machines, including, but not limited to, machines without work implements, machines used for transportation, buses, trains, and wheelchairs.

While the following detailed description and drawings are made with reference to the control system 100 mounted on a skid steer loader, the teachings of this disclosure may be employed on other machines, including, but not limited to, machines used in mining, earth moving, construction, farming, marine, transportation, material handling, or the like machines. For example, although a skid steer loader is shown in certain figures, the machine may generally be an earth-moving machine, such as a wheel loader, excavator, dump truck, backhoe, motor grader, or may alternatively be any other type of machine, such as a material handler, a locomotive, paving machine or the like. Similarly, although an exemplary bucket is illustrated as the attached implement of the illustrated skid steer loader, any implements may be utilized and employed for a variety of tasks, including, for example, loading, compacting, lifting, brushing, and include, for example, buckets, compactors, forked lifting devices, brushes, grapples, cutters, shears, blades, breakers/hammers, augers, and others.

Although the embodiments are generally described in relation to the control of a machine implement, the structures and methods relating to the manual input device have universal applicability to applications involving human-machine interfaces and controls.

Figure 2:
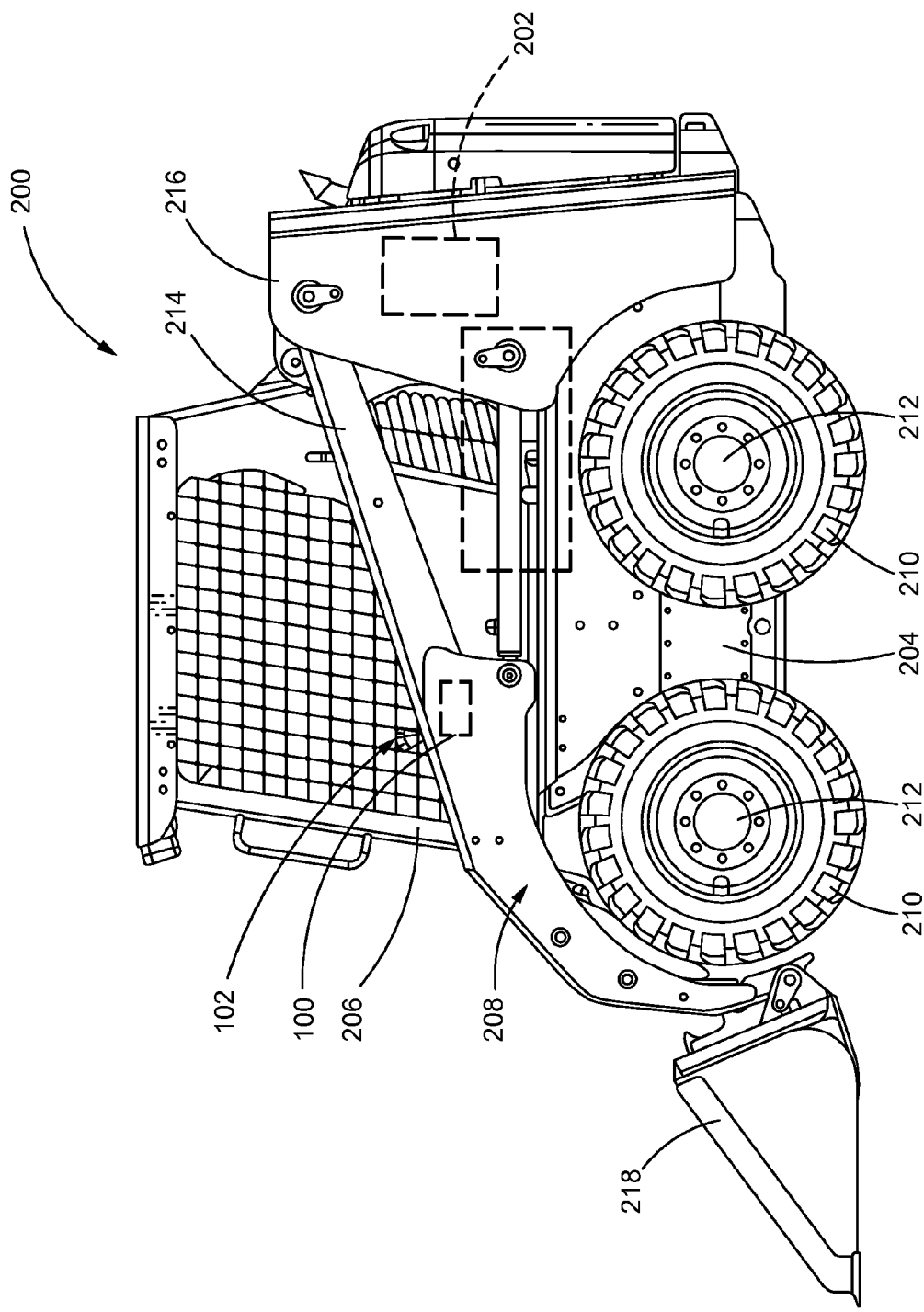
FIG. 2 is perspective view of an embodiment of an exemplary vehicle in which a control system in accordance with the teachings of this disclosure may be used.

FIG. 2 illustrates one example of a machine 200 that incorporates the features of the present disclosure. The exemplary machine 200 in FIG. 2 is a skid steer loader. The skid steer loader 200 includes an engine 202, a main body portion 204, an operator compartment 206, and a lift arm assembly 208. The engine 202 may be any type of engine (internal combustion, gas, diesel, gaseous fuel, natural gas, propane, etc.), may be of any size, with any number of cylinders, and in any configuration ("V," in-line, radial, etc.). Front and rear sets of wheels 210 are mounted to stub axles 212 which extend from each side of the main body portion 202. The lift arm assembly 208 includes lift arms 214 that are pivotally mounted to laterally spaced side members or uprights 216 at the rear of the main body portion 204. The lift arms 214 pivotally carry a bucket, tool, or other implement 218 at the forward end thereof. In an alternative embodiment, the skid steer loader 200 could be belt/track driven or could have a belt entrained around the front and rear wheels 210.

The operator compartment 206 may include a plurality of control devices, such as joysticks, user interfaces, controls and other types of display and input devices to control various implements and operations, for example, wheel speed control, associated with the skid steer loader 200.

Turning back to FIG. 1, the manual input device 102, in the exemplary embodiment, may be a joystick. In other embodiments, the input device 102 may be a pedal, lever, wheel, or the like. The joystick 102 may be mounted to the machine 200 and may include a pivotable body 110. The joystick 102 may be configured to control actuators 112 via the controller 108 in response to user input through appropriate pivotable displacement of the joystick body 110. The actuators 112 may be in operable communication with the controller via communication lines 109. Commands provided by the controller 108 to the actuators 112 may cause movement of an implement on the machine 200. For example, in the exemplary embodiment, the implement is a bucket 218 (FIG. 1) and the various actuators 112 (FIG. 2) provide a plurality of degrees of freedom of motion of the bucket 218.

At least one variable damper 104 may be in operable communication with the joystick 102. Each variable damper 104 has a stiffness and/or range of motion that is adjustable in response to a command signal provided by the controller 108 via a control line 114. In the present disclosure, the term variable damper encompasses any type of damper arrangement that has a variable stiffness capability, including MR fluid-based, or hydraulic dampers having valves to modulate fluid flow therethrough.

In the exemplary embodiment, there are three variable dampers operably connected to the joystick 102. In the exemplary embodiment, each variable damper 104 is a magnetorheological (MR) fluid-based variable damper. Dampers employing MR fluid-based properties may typically include MR fluids that are controlled by a magnetic field, which is typically induced by an electromagnet 116. In this way, the damping characteristics of an MR damper can be finely controlled by appropriately controlling the magnetic flux density and other characteristics of the magnetic field. For example, the viscosity of the MR fluid in the damper can be controlled by controlling the current provided to the electromagnet 116. Alternative variable dampers 104 may be a hydraulic piston arrangement in which a single piston or two opposing pistons is/are displaced when fluid passes into and out from piston volumes. The flow of fluid into and out from the piston volume may be controlled by an electromechanical valve operating to selectively modulate fluid flowing therethrough in response to the command signal provided by the controller 108. In this way, the stiffness of each variable damper 104 may be controlled therethrough the control of the electromechanical valve.

In one exemplary embodiment, the variable damper 104 may include two chambers connected through a flow passage having a predetermined flow orifice therebetween. The area of the flow orifice may be within the effective range of the electromagnet 116. Plungers configured to change the volume of the chambers when moved may be used to push fluid through the orifice when the damper undergoes compressive or tensile axial forces. The viscosity of the MR fluid passing through the orifice, which depends on the intensity of the field created when current passes through the electromagnet 116, will determine the force required to displace the variable damper 104. In alternative embodiments, other MR fluid-based damper arrangements may be used. For example, the MR fluid may be subject to a shearing stress when placed between concentric cylinders, or may be captured within a sponge that is disposed between two moveable walls. In either case, the force required to move the shearing bodies or walls will depend on the intensity of a magnetic field acting on a portion of the fluid. In yet another embodiment, a piston containing a magnet may be disposed in line with an electromagnet within a cylinder such that the force required to move the piston depends on the magnetic field and polarity of the electromagnet 116.

In the exemplary embodiment illustrated in FIG. 1, each of the variable dampers 104 is disposed to be axially compressed or extended by motion of the body 110. The electromagnets 116 associated with each variable damper 104 are responsive to the signals from the controller 108, provided through lines 114 that control the current provided to the electromagnet 116 and thereby change/control the force required to displace each of the variable dampers 104.

A sensor 106 or encoder is configured to provide an input signal to the controller 108. The input signal is indicative of the motion, acceleration, and/or deceleration of the machine. In an embodiment, such an input signal may be based, at least in part, on input from the operator to the input device 102. In other embodiments, the input signal that is indicative of the motion, acceleration, and/or deceleration of the machine, may be based, at least in part, on other measurements. In the exemplary embodiment, the sensor 106 does this by providing an input signal to the controller 108 indicative of the amount of displacement and the speed of displacement of each variable damper 104. The input signal may be provided via communication lines 114. The input signals may be collectively processed in the controller 108 to provide another signal for further processing that may be indicative of the type, direction of motion, acceleration, and/or deceleration of one or more actuators 112 that is commanded by the machine operator. In the exemplary embodiment, commanded by the machine operator by displacement of a joystick 102 in three or more dimensions, for example, by moving and/or twisting the body 110. The input signals may be further processed to determine the nature, frequency and amplitude of a natural or induced machine vibration/oscillation that is transferred to the body 110 and to, as a result, adjust the stiffness of the variable damper 104.

The controller 108 may include a processor 120 and a memory component 122. The processor 120 may be a microprocessor or other processor as known in the art. The processor 120 may execute instructions and generate control signals for processing a signal indicative of machine motion, acceleration/deceleration, and the like to generate a frequency spectrum output, selecting a current amplitude at a frequency of concern from the frequency spectrum output, generating a historical trend of a plurality of amplitudes at the frequency of concern over time, filtering the historical trend to generate a filter output for the current amplitude, mapping the filter output to a damping rate or value, and adjusting the damping provided by a variable damper to the body of a manual input device based on the damping rate or value (as explained below). Such instructions that are capable of being executed by a computer may be read into or embodied on a computer readable medium, such as the memory component 122 or provided external to the processor 120. In alternative embodiments, hard wired circuitry may be used in place of, or in combination with, software instructions to implement a control method.

The term "computer readable medium" as used herein refers to any non-transitory medium or combination of media that participates in providing instructions to the processor 120 for execution. Such a medium may comprise all computer readable media except for a transitory, propagating signal. Common forms of computer-readable media include, for example, a floppy disk, a flexible disk, hard disk, magnetic tape, or any other magnetic medium, a CD-ROM, any other optical medium, or any other medium from which a computer processor 120 can read.

The controller 108 is not limited to one processor 120 and memory component 122. The controller 108 may be several processors 120 and memory components 122.

The controller 108 may receive the input signal from the sensor 106, as described herein for the exemplary embodiment, or a similar sensor that detects motion, acceleration, and/or deceleration. The controller 108 may also be configured to retrieve from the memory component 122 the damping rate command based on the filter output.

INDUSTRIAL APPLICABILITY

Figure 3:
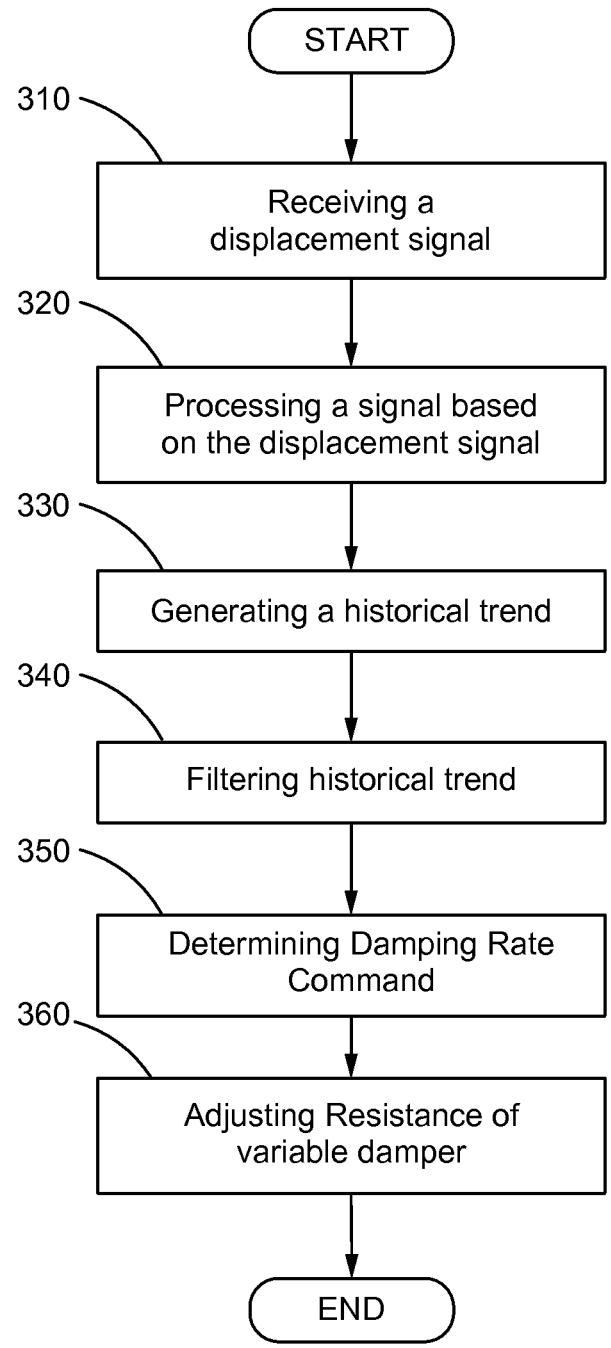
FIG. 3 is flowchart illustrating exemplary blocks of a method for controlling a joystick damping, in accordance with the teachings of this disclosure.

Referring now to FIG. 3, an exemplary flowchart is illustrated showing sample steps which may be followed in controlling the damping of a manual input device such as a joystick having a pivotable body. The method 300 may be practiced with more or less than the number of blocks shown and is not limited to the order shown. Block 310 of the method includes receiving, by a controller 108, an input signal. The input signal may be indicative of the machine motion, acceleration, and/or deceleration in a current time period.

Figure 4:
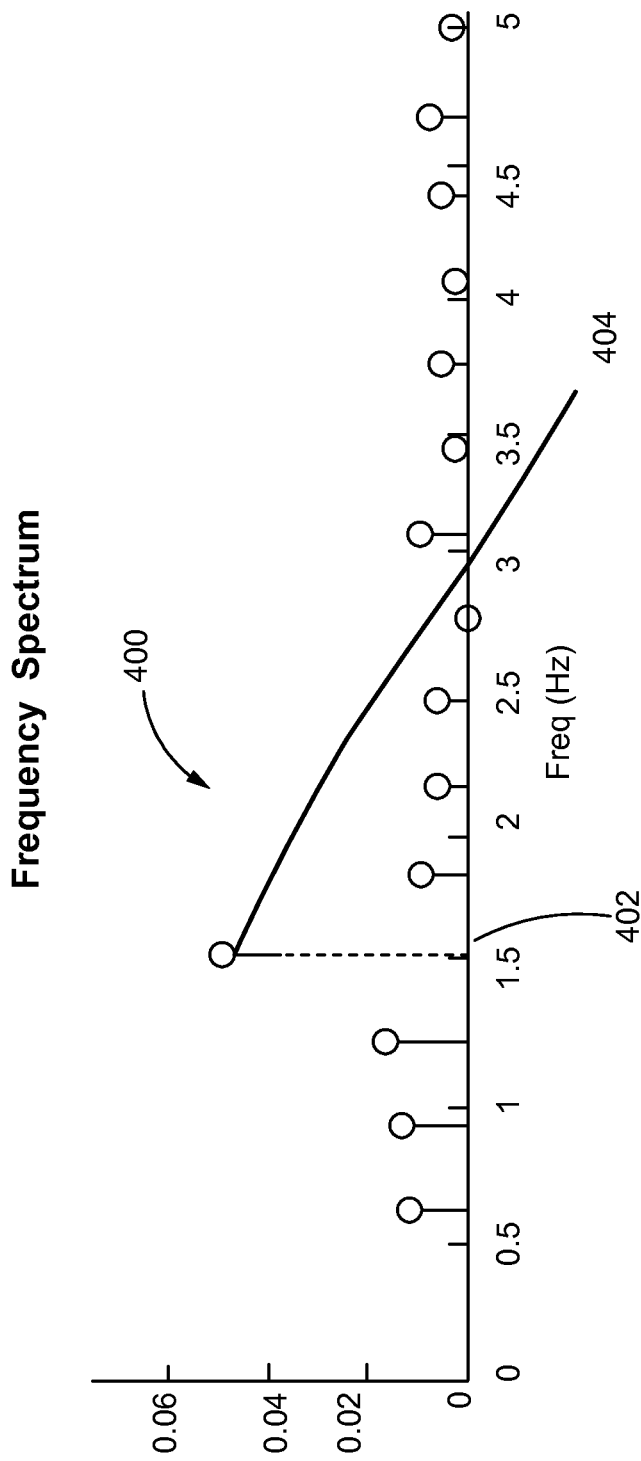
FIG. 4 is an exemplary schematic of a frequency spectrum output, in accordance with the teachings of this disclosure.

In block 320 the controller 108 processes a signal that is based on the input signal received during the current time period. The signal may be processed with a function such as a fast Fourier transform (FFT) in order to calculate or otherwise determine the oscillation amplitudes at difference frequencies, and in particular the amplitude at a frequency of concern. A frequency of concern is a predetermined frequency of interest. For example, a frequency of concern may be one at which the body tends to have oscillations at greater amplitude than at other frequencies. In some embodiments, amplitudes at multiple frequencies of concern may be determined. FIG. 4 illustrates an exemplary frequency spectrum 400 output of such a FFT. In this exemplary frequency spectrum 400, the frequency of concern 402 is 1.5 hertz and the amplitude 404 at this frequency of concern is 0.05.

In some embodiments, the signal to be processed may be the input signal. In other embodiments, the signal to be processed may be a combination of, or an average of, a plurality of input signals received from one or more sensors during the current time period (time window) and indicative of the motion, acceleration, and/or deceleration during the current time period. In other embodiments, the signal may be filtered prior to being processed by the controller to determine the amplitude at a frequency of concern.

Figure 5:
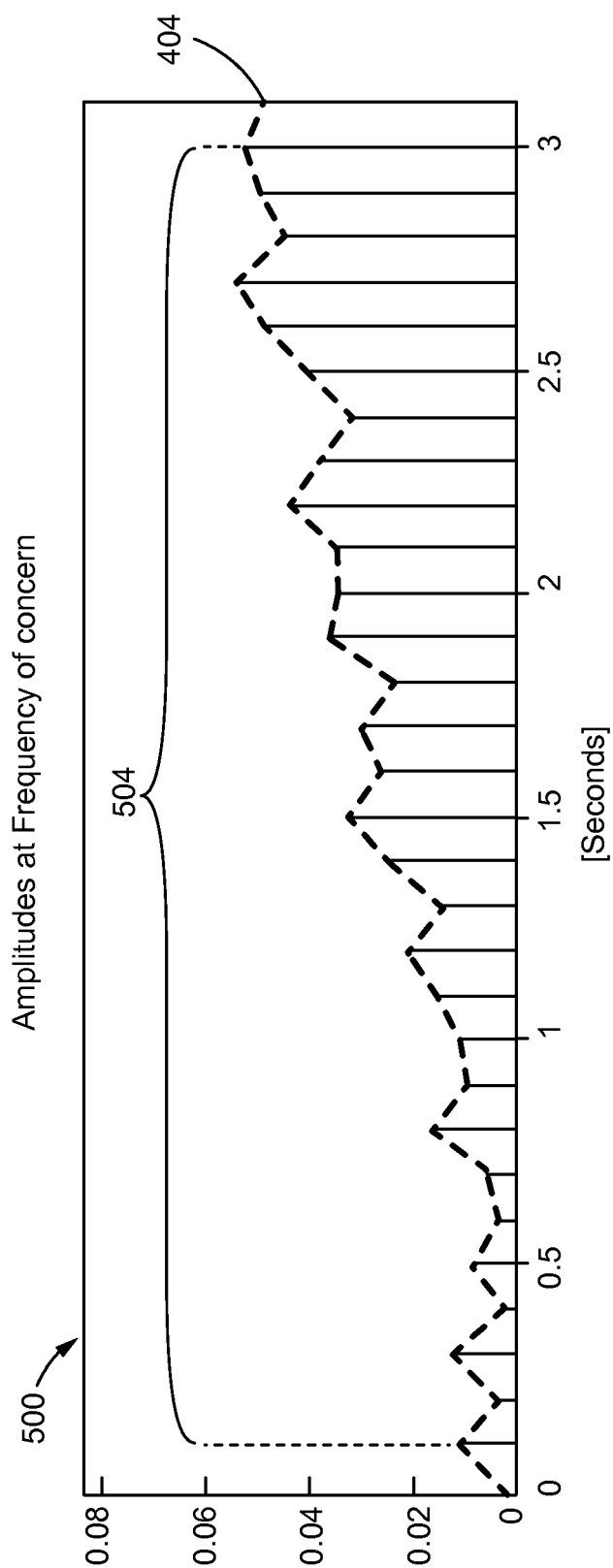
FIG. 5 is an exemplary schematic of a historical trend at a frequency of concern, in accordance with the teachings of this disclosure.

In block 330, the controller generates a historical trend of a plurality of amplitudes at the frequency of concern over time. In order to distinguish from amplitudes obtained in preceding time periods, the amplitude at a frequency of concern obtained during the current time period will be referred to herein as the "current amplitude" and amplitudes at the frequency of concern obtained from input signals transmitted by the sensor during past time periods that precede the current time period will be referred to herein as "preceding amplitudes". The plurality of amplitudes that make up the historical trend include the current amplitude and preceding amplitudes at the frequency of concern. FIG. 5 illustrates an exemplary historical trend 500. The last amplitude charted is the current amplitude 404 (see FIGS. 4-5). The remaining amplitudes are the preceding amplitudes 504 obtained during earlier time periods. As can be seen, the exemplary historical trend 500 at this frequency of concern (1.5 hertz) shows that the amplitudes are generally increasing.

Figure 6:
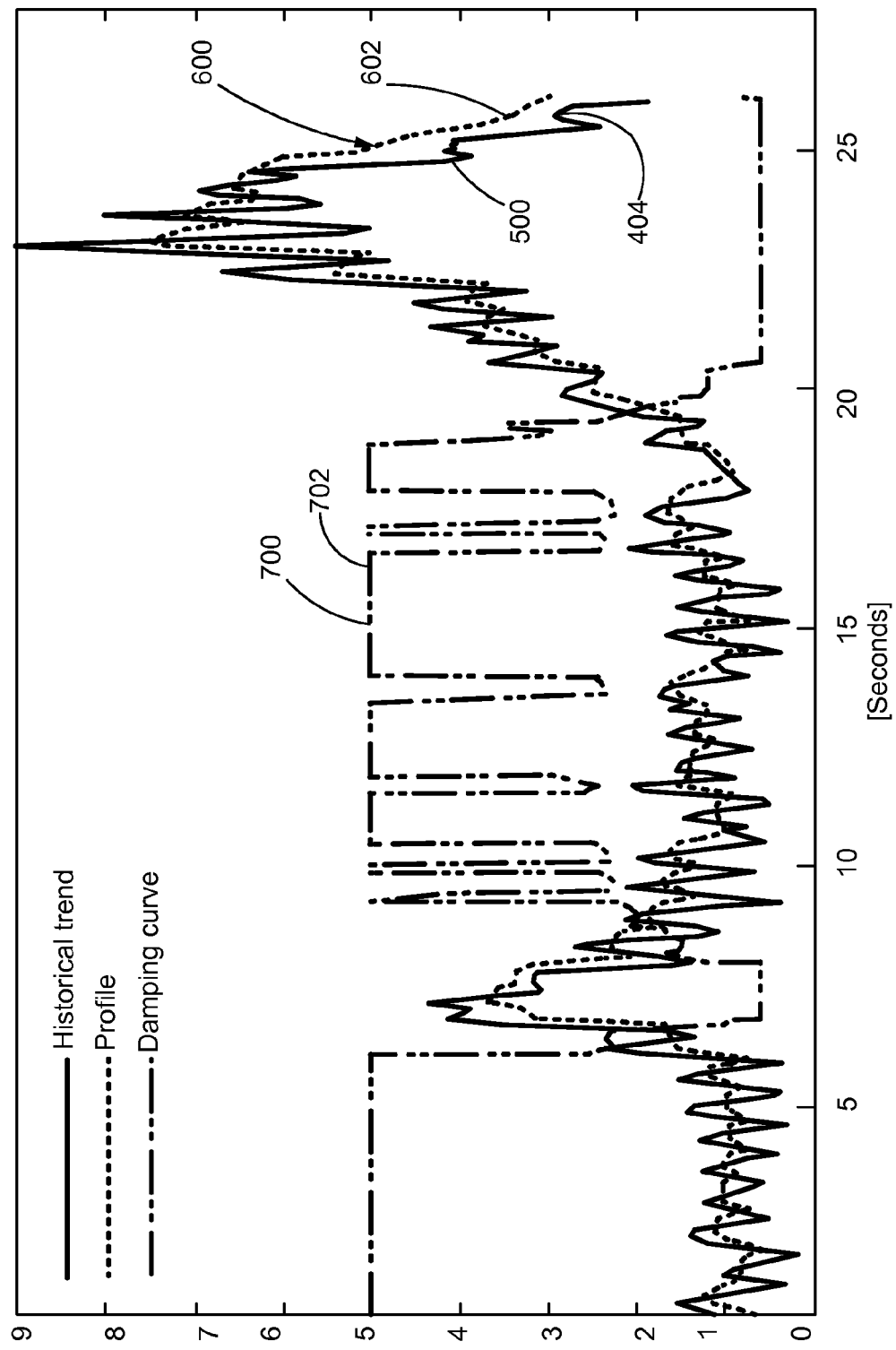
FIG. 6 is a schematic of illustrating an exemplary damping curve and profile superimposed on an exemplary historical trend.

In block 340, the historical trend may be filtered. Such filtering may be done to modulate the response of the system to changes in amplitudes at the frequency of concern and modulate the damping of the variable damper operably connected to the manual control device. FIG. 6 is an illustration of another historical trend 500 (solid line) at an exemplary frequency of concern plotted across time. The filtering creates a filter output 602 for the current amplitude 404 at the frequency of concern. When plotted, the filter outputs 602 over time create a profile 600 (broken line). FIG. 6 illustrates such a profile 600. The profile 600 is shown for comparison purposes as superimposed on the historical trend 500. The filtering may generate a filter output 602 that has a different value than the current amplitude 404. As can be seen in profile 600 shown in the exemplary embodiment of FIG. 6, the filtering may smooth the spikes in the historical trend 500. In addition, the amplitudes at the frequency of concern may be filtered such that the rate of decrease of the amplitudes in the profile 600 may be slower than in the historical trend 500. Further, the amplitudes at the frequency of concern may also be filtered such that the rate of increase in the amplitudes of the profile 600 may be similar to the rate of increase in the historical trend 500. Such filtering strategies allow the system to take into account the historical progression of amplitudes at a frequency of concern. For example, the exemplary filtering arrangement described above may quickly increase the damping of the joystick when the amplitudes for a frequency of concern are growing and decrease the damping (stiffness) of the joystick at a slower rate than the rate at which the amplitudes at the frequency of concern are decreasing. Other filtering strategies may also be employed.

In block 350, the output of the filtering of block 340 may be utilized to determine a damping rate or value 702. In the exemplary embodiment, the output of the filtering block 340 may be mapped to a damping rate or value 702 (damping output) corresponding to a damping command. For example, each filter output 602 may be mapped to a damping rate or value corresponding to a damping command. The damping rates or values 702 corresponding to a damping command may be stored in memory in a lookup table or the like, or may be calculated based on output of the filtering of block 340.

In block 360, the resistance of the variable damper is adjusted. The system uses the damping rate or value 702 to adjust the resistance of the body 102 to movement by adjusting the damping provided by the variable damper 104 to the body 102. In one embodiment, the controller 108 may, through a command signal, adjust the amount of current provided to the electromagnet 116 based on the damping rate or value 702 selected in block 350. Referring again to FIG. 6, therein an exemplary damping curve 700 (of values corresponding to the damping command over time) of the variable damper 104 is shown superimposed on the historical trend 500 and the filter profile 600. When the damping curve 700 is low the system will increase the resistance of the body 102 to movement (stiffen). When the damping curve 700 is high, the system will decrease the resistance of the body 102 to movement (loosen).

Also disclosed is a computer program product, comprising a non-transitory computer usable medium having a computer readable program code embodied therein, the computer readable program code adapted to be executed to implement a method for controlling input device damping for an input device mounted on a machine, the method comprising processing a signal based on an input signal to determine a current amplitude at a frequency of concern, the input signal indicative of the machine motion, acceleration, and/or deceleration during a current time period, filtering a historical trend of a plurality of amplitudes at the frequency of concern to generate a filter output, the plurality of amplitudes including the current amplitude and preceding amplitudes, each of the preceding amplitudes obtained from the input signals transmitted by the sensor during past time periods that precede the current time period, and based on the filter output generated by the filtering, adjusting, by the controller, the resistance of the input device to movement by adjusting the damping provided by a variable damper to the input device, the variable damper operably connected to the input device.

The features disclosed herein may be particularly beneficial for use with manual control devices on mining, earth moving, construction, farming, marine, transportation, material handling machines. The ability to adjust the stiffness of the manual input device depending on the OIO facilitates better control of the machine/implement.

What is claimed is:

1. A control system comprising:
   a manual input device mounted to a machine and including a pivotable body;
   a sensor that transmits to a controller an input signal indicative of a motion, acceleration or deceleration of the machine in a current time period;
   a variable damper that selectively alters a resistance of the body to displacement based on a command signal transmitted by the controller, the variable damper operably connected to the body; and
   the controller in operable communication with the sensor and the variable damper, the controller configured to:
      process a signal based on the input signal to determine a current amplitude at a frequency of concern;
      filter a historical trend of a plurality of amplitudes at the frequency of concern, the plurality of amplitudes including the current amplitude and preceding amplitudes, each of the preceding amplitudes obtained from input signals transmitted by the sensor during past time periods that precede the current time period; and
      based on the filter of the historical trend, to adjust the resistance of the body to movement by adjusting a damping provided by the variable damper to the body.

2. The control system of claim 1, wherein the filter of the historical trend generates a filter output having a different value than the current amplitude.

3. The control system of claim 2, wherein the filter of the historical trend generates a profile that smoothes spikes in the historical trend, while allowing a faster rate of increase in amplitudes than rate of decrease.

4. The control system of claim 1, wherein the variable damper is a magnetorheological fluid-based variable damper.

5. The control system of claim 4, further comprising an electromagnet configured to produce a magnetic field, the electromagnet in operable communication with the variable damper and the controller, wherein the command signal adjusts an amount of current provided to the electromagnet based at least in part on the filter of the historical trend.

6. The control system of claim 5, wherein the controller is further configured to map a filter output of the filtering of the historical trend to a damping rate command, wherein further the amount of current provided to the electromagnet is determined by the damping rate command.

7. The control system of claim 1, wherein the controller is further configured to map a filter output of the filtering of the historical trend to a damping rate command and an amount of resistance of the body is determined by the damping rate command.

8. The control system of claim 1, wherein the signal processed by the controller represents a combination of a plurality of input signals received during the current time period.

9. The control system of claim 1, wherein the controller is further configured to use a FFT to process the signal in order to determine the current amplitude at the frequency of concern.

10. A method of controlling input device damping of an input device mounted to a machine and including a pivotable body, the method comprising:
    processing a signal based on an input signal to determine a current amplitude at a frequency of concern, the input signal indicative of a motion, acceleration, or deceleration of the machine during a current time period;
    filtering a historical trend of a plurality of amplitudes at the frequency of concern to generate a filter output, the plurality of amplitudes including the current amplitude and preceding amplitudes, each of the preceding amplitudes obtained from the input signals transmitted by a sensor during past time periods that precede the current time period; and
    based on the filter output generated by the filtering, adjusting, by a controller, a resistance of the input device to movement by adjusting a damping provided by a variable damper to the input device, the variable damper operably connected to the input device.

11. The method of claim 10, wherein the signal processed by the controller represents a combination of input signals received during the current time period.

12. The method of claim 10, wherein a profile of filter outputs over time has a slower rate of decline for amplitudes at the frequency of concern than the rate of decline in the historical trend.

13. The method of claim 10, wherein a profile of filter outputs over time smoothes spikes that occur in the historical trend, and allows a faster rate of increase in profile amplitudes than rate of decrease.

14. The method of claim 10, wherein the variable damper is a magnetorheological fluid-based variable damper.

15. The method of claim 14, further comprising producing a magnetic field with an electromagnet, the electromagnet in operable communication with the variable damper, wherein the controller adjusts an amount of current provided to the electromagnet based, at least in part, on the filtering of the historical trend.

16. The method of claim 15, further comprising mapping the filter output to a damping rate command that determines the amount of current provided to the electromagnet.

17. The method of claim 10, further comprising mapping the filter output to a damping rate command, wherein an amount of resistance of the body is determined by the damping rate command.

18. The method of claim 10, wherein the controller is further configured to use a FFT to process the signal.

19. A computer program product comprising a non-transitory computer usable medium having a computer readable program code embodied therein, the computer readable program code adapted to be executed to implement a method for controlling input device damping of an input device mounted to a machine, the method comprising:
    processing a signal based on an input signal to determine a current amplitude at a frequency of concern, the input signal indicative of a motion, acceleration, or deceleration of the machine during a current time period;
    filtering a historical trend of a plurality of amplitudes at the frequency of concern to generate a filter output, the plurality of amplitudes including the current amplitude and preceding amplitudes, each of the preceding amplitudes obtained from the input signals transmitted by the sensor during past time periods that precede the current time period; and based on the filter output generated by the filtering, adjusting, by a controller, a resistance of the input device to movement by adjusting a damping provided by a variable damper to the input device, the variable damper operably connected to the input device.

20. The computer program product of claim 19, wherein the filter output is different from the current amplitude.

* * * * *